United States Patent [19]
Kowalski

[11] Patent Number: 5,550,919
[45] Date of Patent: Aug. 27, 1996

[54] METHOD AND DEVICE FOR LIMITING THE NUMBER OF AUTHENTICATION OPERATIONS OF A CHIP CARD CHIP

[75] Inventor: Jacek Kowalski, Trets, France

[73] Assignee: Gemplus Card International, Gemenos, France

[21] Appl. No.: 248,475

[22] Filed: May 25, 1994

[30] Foreign Application Priority Data

May 26, 1993 [FR] France ................... 93 06312

[51] Int. Cl.⁶ ....................................... H04L 9/32
[52] U.S. Cl. .................. 380/23; 380/24; 380/25; 235/379; 235/380
[58] Field of Search ................... 380/4, 23, 24, 380/25; 235/379, 380

[56] References Cited

U.S. PATENT DOCUMENTS

| | | | |
|---|---|---|---|
| 4,572,946 | 2/1986 | Schrenk | 235/380 |
| 4,667,087 | 5/1987 | Quintana | 235/380 |
| 4,819,202 | 4/1989 | Schrenk | 235/380 |
| 4,827,450 | 5/1989 | Kowalski | 365/185 |
| 4,868,489 | 9/1989 | Kowalski | 324/61 |
| 4,881,199 | 11/1989 | Kowalski | 365/189.01 |
| 4,882,474 | 11/1989 | Anderl et al. | 235/380 |
| 4,890,187 | 12/1989 | Kowalski et al. | 361/111 |
| 4,896,298 | 1/1990 | Kowalski | 365/189.01 |
| 4,916,333 | 4/1990 | Kowalski | 307/296.5 |
| 5,003,371 | 3/1991 | Kowalski et al. | 357/42 |
| 5,022,001 | 6/1991 | Kowalski | 365/185 |
| 5,060,198 | 10/1991 | Kowalski | 365/201 |
| 5,060,261 | 10/1991 | Kowalski et al. | 380/3 |
| 5,097,146 | 3/1992 | Kowalski et al. | 307/305 |
| 5,146,068 | 9/1992 | Ugawa et al. | 235/379 X |
| 5,191,498 | 3/1993 | Kowalski | 361/1 |
| 5,291,434 | 3/1994 | Kowalski | 365/96 |
| 5,365,587 | 11/1994 | Campbell et al. | 380/25 |

FOREIGN PATENT DOCUMENTS

| | | | |
|---|---|---|---|
| 0157303 | 10/1985 | European Pat. Off. | G06F 1/00 |
| 2647929 | 5/1989 | France | G07F 7/10 |
| WO92/06451 | 4/1992 | WIPO | G06K 19/06 |
| WO92/15096 | 9/1992 | WIPO | G11C 8/04 |
| WO92/15074 | 9/1992 | WIPO | G06K 19/06 |
| WO93/05513 | 3/1993 | WIPO | G11C 16/06 |
| WO93/15477 | 8/1993 | WIPO | G06K 19/07 |

OTHER PUBLICATIONS

Patent Abstracts Of Japan vol. 11, No. 12 (P–535) 13 Jan. 1987 & JP–A–61187075 (Toshiba Corp) 20 Aug. 1986.

*Primary Examiner*—Bernarr E. Gregory
*Attorney, Agent, or Firm*—Nilles & Nilles, S.C.

[57] ABSTRACT

To resolve the problems related to the divulgation of the algorithms for the transcoding of the secret codes in chip cards, notably prepayment type chip cards, it is planned to limit the number of authentication operations possible by the number of units contained in the card. It is shown that in this case this number, which is generally small, for example about a hundred units, limits the number of attempts that can be made by a fraudulent person trying to penetrate the mysteries of the secret enciphering algorithm.

18 Claims, 2 Drawing Sheets

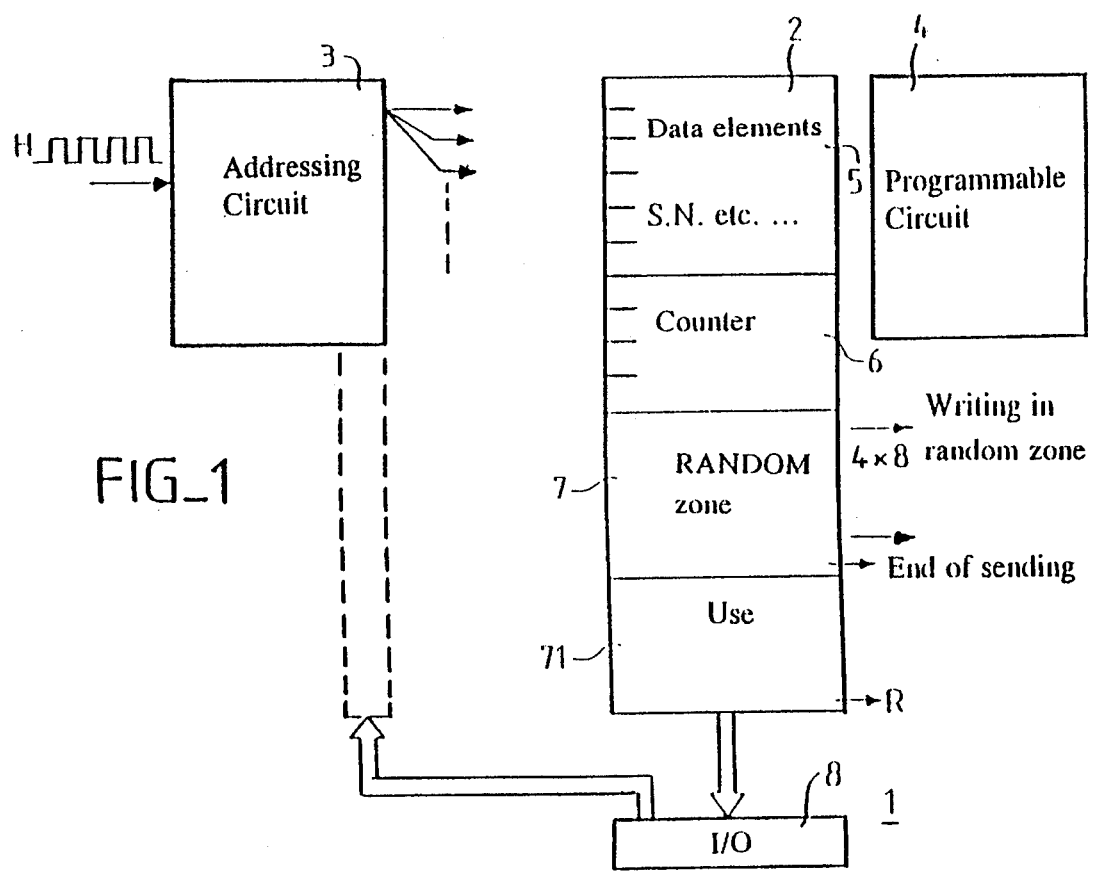
FIG_1
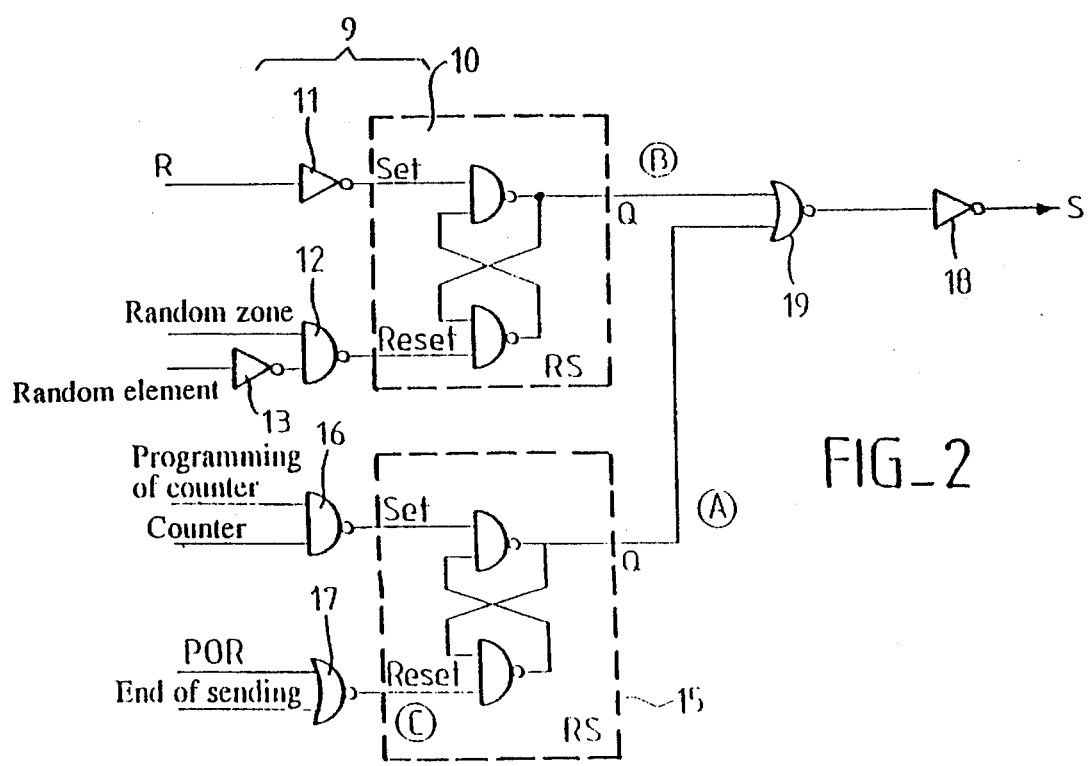
FIG_2

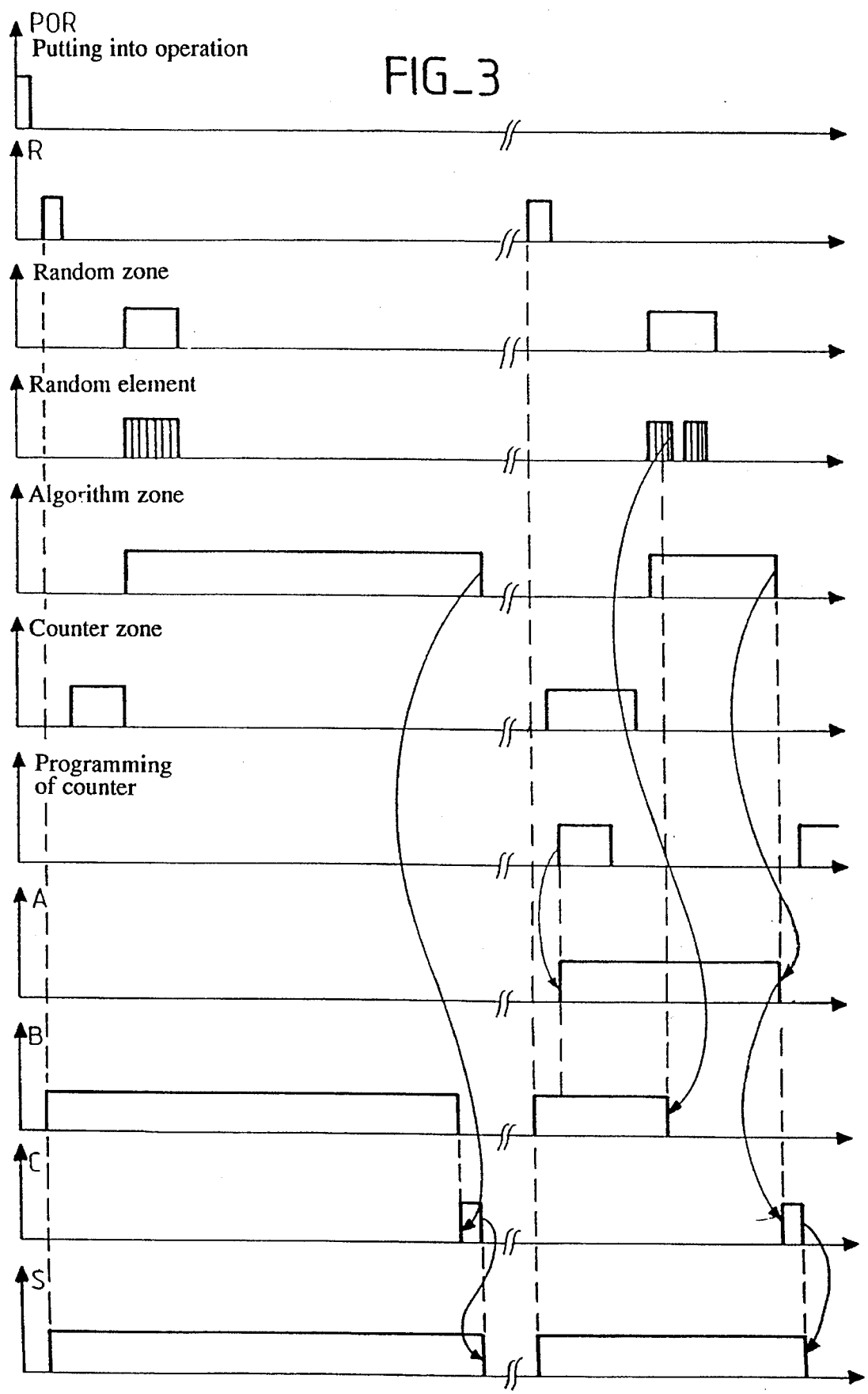
FIG_3

METHOD AND DEVICE FOR LIMITING THE NUMBER OF AUTHENTICATION OPERATIONS OF A CHIP CARD CHIP

An object of the present invention is a chip card chip provided with a means to limit the number of authentication operations by someone who might be ill-intentioned and is making attempts designed to find out a secret enciphering algorithm of the card.

In the field of chip cards, different uses of these cards are known. They are bank cards in which case the particulars that they contain refer to a file or to a register maintained in a banking organization in the name of the bearer of the card. The mechanism used to authenticate such cards consists in ascertaining that the card truly belongs to the bearer of the card who knows a secret code of the card. The principle of authentication is as follows.

The card is inserted into a chip card reader. The reader sends the card a random data element which may or may not be enciphered. The card receives this random data element and, as a function of this random data element, transcodes a secret code of the card and sends out the transcoded secret code or the transcoded random element (whether enciphered or not) to the reader. The reader, since it knows the random data element, can decode the transcoded secret code, obtain knowledge of the real values represented by this code and compare this secret code with an identification code which the bearer, besides, will have indicated by means of a keyboard to the reader. Mechanisms of greater complexity than this one are implemented in practice but, as regards their principle, this is the way in which they are organized in this way. Normally, after a certain number of unsuccessful attempts, generally three attempts, the reader assumes that the bearer of the card is not the regular bearer and keeps the card. The card is swallowed up and the bearer can no longer have it at his disposal.

In another field, notably that of telecommunications, the process is even simpler. Since the bearer of the card is not even asked to give any identification code with a keyboard, the transcoded random element sent by the card is directly interpreted by the reader. Since the reader knows the serial number of the card (and transcoding algorithms assigned to this series), it is capable of noting that the card has accurately computed the conversion of the random element that has been sent to it and that it is therefore a card in keeping with the use intended for it by the organization that has issued it: as a rule this organization will be a telephone communications company. After the recognition of these secret codes, the use of the card may be launched. It is therefore important that it should not be possible to simulate this authentication recognition. It is therefore important that it should not be possible to produce a transcoded random element by fraudulent means through knowledge of a received random element.

The problem therefore lies in the preservation of the transcoding, the computation implemented by an algorithm in the card. For different reasons, the computations can be made in the card with wired circuits. The performance of the algorithm that corresponds to them is then rarely brought into question. It is therefore important that it should not be possible for a fraudulent individual, by making numerous attempts, to send as many random elements as be would like to the card and, depending on the response of the card after a certain number of attempts, deduce the transfer function of this algorithm. If such a deduction were possible, the fraudulent individual would have a means of falsifying a card at his disposal, to the point where he would be able to convert it into a tool for the free consumption of banking or telephone services.

Besides, it is not possible to take the cards away from these fraudulent individuals, notably because the fraudulent activity would be practised at home using readers manufactured by the fraudulent individuals themselves.

It is therefore necessary, with the invention, to have a device or a method proper to the card for limiting the number of the authentication operations.

The present invention can be used to attain this goal and to make the detection of the algorithm far more complicated and even impossible. The principle of the invention is as follows. When the chip of the chip card has just been powered in the reader, it is planned to authorize a first authentication by sending a characteristic random code, which is always the same one, at the start of the session, to the card. For example, this characteristic random code is not random at all but has, for example, a succession of bits that are all identical. For example, these bits are all ones (or possibly all zeros). The transcoding of this known characteristic random code enables the card to send back a known transcoded random element. There is no harm at all in letting the fraudulent individual detect this known transcoded random element: it is always the same one.

Thereafter however, when the card is being used, a real implementation of the authentication procedure will be authorized under certain conditions. In particular, the sending to the reader of a transcoded random element that corresponds to another received random element will be authorized only if the state of a register, in one example a counter of units, has been converted during the session preceding the second authentication.

In the field of phonecard type cards, after the units have been counted, an authentication operation (with the sending of a random element, the transcoding of a random element and the retransmission of the transcoded random element) is prompted whenever a unit has been consumed. This is permitted by the circuits of the chip, according to the invention, by the sole fact that the counter of units has changed its state. Quite clearly, a fraudulent individual who has managed to prevent the count-down or counting out of units by the counter will be unable to achieve this result. Whereas he has succeeded in going through the first authentication, the fraudulent individual will be incapable of going through the second one. He will be incapable of putting through a series of random elements (different from the characteristic random element) and of taking apart the transcoding algorithm implemented in the chip. Ultimately, with a card possessing about a hundred units, the number of possible tests is limited to a hundred. This is not enough to deduce the transfer function of the algorithm by a reverse function.

An object of the invention therefore is a chip card chip provided with a means to limit the number of authentication operations that can be carried out with this chip, characterized in that it comprises a first wired logic circuit for the detection, when the chip is powered or after a resetting command, of a characteristic presentation, which is always the same one, at an input of this chip, of a succession of characteristic authentication bits and for the authorizing of a corresponding authentication, a second logic wired circuit for the detection of a change in state of a register of the chip and a third wired validation circuit to validate the performance of an authentication corresponding to a presentation of authentication bits that are different from the characteristic bits as a function of the state of the first two logic circuits.

Although the invention is described herein with a set of circuits, it is possible to make a variant thereof in software form, notably for banking type applications. The term "means" is therefore understood to cover both these possibilities.

The invention will be understood more clearly from the following description made with reference to the accompanying figures. These figures are given purely by way of an indication and in no way restrict the scope of the invention. Of these figures:

FIG. 1 exemplifies a chip protected according to the mechanism of the invention;

FIG. 2 is a schematic drawing of a logic circuit used to implement the invention; and FIG. 3 shows timing diagrams of signals implemented in the circuit of FIG. 2.

FIG. 1 exemplifies a chip 1 provided with a limitation circuit of the invention. The chip 1 has a memory 2, a circuit 3 for addressing the memory and a wired or possibly programmable circuit 4 for the implementation in a complete way of a particular use of the card: in banking mode, prepayment mode or other modes. The memory 2 and the circuits 3 and 4 are linked to one another in a usual way. If the circuit 4 is not solely a wired circuit, it has, according to its principle, a microprocessor carrying out instructions. These instructions may, in particular, be stored in the memory 2. The invention can be applied more particularly to the chips provided with a serial access non-volatile memory 2: the addressing circuit 3, by virtue of its principle, comprises a counter connected to a clock putting through a clock signal H. The outputs of the counter are address signals that can be used for the selection, one after the other, of the words or memory cells of the memory 2.

These memory words can be arranged in several contiguous zones. For example, in a first zone 5, there may be stored data elements specific to the chip and/or to the card such as notably the serial number of the card. In a consecutive zone 6, the state of a counter (of prepaid or consumed units) may be recorded. In a following zone 7, it is possible to store a random element either in the form received before its conversion or in a transcoded form.

The invention is described herein in a particular known application where the addressing circuit 3 activates, at the same time as the addressing, the performance by the wired circuit 4 of signal processing operations, notably transcoding operations. For example, at each clock pulse, while the circuit 3 selects a new address in the memory 2, the wired circuit 4 is designed to transcode signals that are at its disposal. This transcoding corresponds to the transcoding of the random element received only when the circuit 3 itself designates the first memory cell of the random zone 7.

Another particular feature of the circuit 4, which is of a known type, is that when the first memory cell of the zone 7 is designated, the circuit 4 writes therein the result of the transcoding operation that it has just performed on a first bit (0 or 1) of a random element that it has just received. In the application described, it is planned to send 32 random bits successively in this way. When, in this application, the circuit 3 designates the 29th cell of the zone 7, the circuit 4 not only transcodes the received random element and writes it in the 29th place but also sends it to an input/output circuit 8 linked with the reader (not shown). In practice, first of all 32 transcoded random bits are written and then 32 computation operations are redone with the stored transcoded random element (and no longer with the received external random element). It is in the last part of the 32 bits thus recomputed that the last four bits are put out by way of a result. When the 32nd random bit is received, transcoded and then retransmitted, the reader linked with the card 1, knowing the serial number of the card (read during the reading of the zone 2), can pick up a mode of transcoding of the circuit 4 (assigned to this series of cards) from a table and ascertain that the last four bits which it has just received correspond to the bits that it should have received. In the event of success, the use of the card is permitted and the circuit 4, notably when it is programmable, can implement operating instructions stored in a zone 71 following the zone 7 in the memory 2. If the reading of the card is not serial and if the addressing is not done in this way, it is seen to it that there is a starting protocol of the same type. This protocol notably includes the sending of a characteristic random element.

In the invention, it can be planned that the first random code sent to the card will not be random at all but, on the contrary, quite expected. For example, it has a series of 32 bits equal to 1. It is possible to choose 32 bits equal to 0 or even a different configuration, provided that in the circuit 4 it will be possible to set up a circuit to detect the appearance of this expected, received random sequence. In the example shown, this detection is all the easier as all the bits are of the same nature. To the sending of this characteristic random code, there corresponds an authentication hereinafter called a pseudo-authentication with retransmission, by the card, of a transcoded random code that is always the same. It shall be seen hereinafter that the retransmitted transcoded code can also be different every other time. Once this pseudo-authentication has been implemented, it is possible, depending on the mode of use of the card or in a routine way, to prompt the operation of a counter whose state is memorised in the zone 6. After the pseudo-authentication, or else if this pseudo-authentication has not been attempted, the subsequent authentication operations or other authentication operations are authorized only if this counter has changed its state. A counter with a limited number of units is chosen. For example, preferably a counter of prepaid units is chosen. Consequently, it then becomes impossible for a fraudulent person to simulate the working of a reader a great many times and send successive random elements if the counter has not been subjected to any subtraction. Beyond a certain number of units, the counter is out of operation and the card no longer responds to the signals sent to it. As a variant, the counter may be replaced by a register associated with a mean of detecting the change in the state of the register. In this case, either the contents of the register come into play in the transcoding or else the number of changes of state of the register is limited in one way or another.

In one example (FIG. 2), the circuit for limiting the number of authentication operations of the chip of the invention has a first logic circuit 9 for the detection, when the chip is powered, of the presenting of a succession of characteristic bits at an input of this chip. For example, the circuit 9 has an RS gate 10 whose Set input receives a signal R given by an invertor 11 and whose Reset input receives a signal given by a NAND gate 12. The NAND gate 12 receives a signal known as a "random zone" signal going to the active state (to the state 1 in positive logic) as soon as the output of the addressing circuit 3 designates the first memory cell of the zone 7. The NAND gate 12 also receives, through an invertor 13, a so-called "random" signal corresponding to the 32 random bits received by the card. In a first example, the 32 bits of the random element are equal to 1. Consequently, the output of the NAND gate 12 is taken to 1 during the sending of this pseudo-random element. By contrast, thereafter, when a true random element is sent, it will necessarily comprise a 0 bit on the 32 bits. Consequently, a signal B, which can be seen in FIG. 3, available at output of the flip-flop 10 and kept in the state 1 during the first stage, will fall as soon as this first 0 bit appears. In a twofold way, it is possible to conceive of an operation with zeros by removing the invertor 13.

The signal R applied to the input of the invertor 11 is a signal that becomes active as soon as the first cell of the memory 2 located in the zone 5 is read. R therefore becomes active either after the power is turned or after an addressing reset operation. Consequently, during the starting, at least during the pseudo-authentication, the signal B is equal to 1.

Subsequently, when the circuit 4 detects the end of the implementation of the algorithm and of the sending of the transcoded random factor, it sends an end-of-sending signal to a second logic circuit 14 which too has an RS flip-flop circuit 15. The RS flip-flop circuit 15 receives, at its Set input, a signal delivered by a NAND gate 16 and at its Reset input a signal delivered by a NOR gate 17. The gate 16 receives, at input, a signal representing the addressing of the start of the counter zone 6 as well as a signal indicating the programming of a unit in this counter. The gate 17 receives, at input, a resetting signal POR when the chip is reset or powered, as well as the end-of-sending signal (of the end of transmission of the transcoded random element to the reader). In practice, this end-of-sending signal may be activated by an access to a first memory cell of the zone 71 for the use of the memory 2. It may also be a signal going through a monostable circuit or even quite simply the clock signal that correspond to the selection of the first memory zone of the zone 71. This pulse prompts the resetting of the flip-flop circuit 15 and consequently the return to 0 of a signal S available at output of an invertor 18 connected to the output of a NAND gate 19 that receives, at input, the Q outputs respectively of the RS flip-flop circuits 10 and 15.

The signal S is used in the invention to validate all the authentication operations. For example, it authorizes the transmission of the pseudo-random element transcoded during the first run as well as the transmissions of the transcoded successive random elements, if it is in the state 1.

Thereafter (cf. FIG. 3), it is noted that signal S is taken to the state 1 when a programming is done in the counter. Indeed, in this case, a signal A at a Q output of the gate 15 is taken to a state 1 which furthermore takes the signal S to a state 1 also. The signal S is taken to a state 0 whenever an authentication has been validated, i.e. whenever the transcoded random element is sent out.

It also observed that if a programming of the counter has not occurred, it is possible that the signal S will rise temporarily to 1 because of the addressing of the random zone as well as the joint reception of a number of random bits in the state 1. However, as soon as there is the first reception of a random bit in the state 0, the signal B falls back to 0. With it, it brings about a drop of the signal S. This signal S is kept at 1 in the right-hand part of FIG. 3 only through the presence of the signal A. In practice, the flip-flop circuit 15 is used for the memorising, from one authentication period to another, of the fact that a programming of the counter has occurred. It is also possible to envisage any other cyclical phenomenon rather than a counter programming. Should the memory 2 in question be an EPROM or EEPROM type memory, this programming will be detected on the basis of the potentials specific to this technology implemented to carry it out.

The circuit of FIG. 2 can be done in many other ways. Normally, this circuit is incorporated into the circuit 4. However, if this circuit 4 has a microprocessor, the circuit of FIG. 2 may be replaced by a microprogram. The version indicated herein is especially suited, because it is simple, to the management of cards of the type using prepaid units.

In a particularly promising embodiment, an alternative form of operation is chosen. Either, for various reasons, it is not desired to count down the authentication operations and, in this case, it is still the characteristic random element corresponding to the pseudo-authentication that is sent to the card. In this case, the operation of the card is authorized if this pseudo-authentication is accurate. Or else, it is desired to make a direct count-down of the authentication operations and not go through a preliminary step of pseudo-authentication. The invention is then noteworthy in that it comprises, in the first wired circuit 10, a circuit to detect the nature of the received random element and to find out whether or not this random element is a random element that requires a count-down of the uses. A detector circuit of this kind, whose output is connected for example to the input of the invertor 13, is constituted for example by a decoder that is parallel connected to a shift register that receives the random element. As soon as the state of this shift register corresponds to the characteristic state, the output of the decoder becomes active. If the random element is different from the characteristic element, the output of the decoder does not become active.

In the case of the variant however, in order to prevent the response of the chip to a characteristic random element that is always the same from being always the same, it is possible to transcode the random element in the card according to an algorithm that evolves as a function of the state of a variable register, i.e. a variable counter (notably the counter of units), of the chip. Thus, a random element to be transcoded will undergo modifications related to constant parts of the algorithm (these constant parts depending for example on the production batch to which the card belongs, the reader being informed about this batch by a prior reading of the serial number of the card) and related to parts of the algorithm that can be parametrized (the parameters used are for example the result of the counter of units or rather of a counter of a number of operations which is furthermore sent also to the reader). Under these conditions, the reader sends the random element and receives in return: (1) an information element on serial number, (2) the value of the variable parameter, and (3) the transcoded random element. This element (3) is therefore different at each operation since a counter of operations will have changed its state in the meantime. This transcoded random element is therefore neither falsifiable nor detectable by the fraudulent individual. Indeed, in this case, all that the fraudulent individual has at his disposal is the pseudo-random element to make as many tests as he wishes.

If he wishes to try out another random element, there will automatically be a count-down of units in the unit counter. In this case, indeed, the circuit 4 is such that it authorizes an authentication (on the basis of a random element different from the characteristic random element) only on condition that there has been a prior count-down by one unit. In practice, the counting down of units is, in this case, controlled by the output of the circuit 9 which detects the presence or non-presence of the characteristic random element.

What is claimed is:

1. A device for limiting the number of authentication operations executed by a chip card chip, the device comprising:

a first logic circuit defining means for detecting a presentation of characteristic bits, the characteristic bits being the same for each authentication operation executed, and means for authorizing an authentication operation based on the presentation of the characteristic bits;

means for counting the number of authentication operations executed by the chip card chip means for comparing the number of authentication operations executed by the chip card chip with a limit;

a second logic circuit defining means for detecting a change in state of the means for counting;

means for limiting the number of authentication operations executed by the chip card chip, said means for limiting comprising a third validation circuit defining means for validating the performance of the authentication operation on a presentation of authentication bits, the validating being performed as a function of the state of the first logic circuit such that the validation is performed only if the presentation of characteristic bits has been detected and as a function of the second logic circuit such that the validation is performed only if the change in state of the means for counting has been detected; and means for connecting the device for limiting to the chip card chip.

2. The device according to claim 1, wherein the means for counting is a counter comprising non-volatile memory cells.

3. The device according to claim 1, wherein the first wired logic circuit comprises a first RS flip-flop circuit;

the second wired logic circuit comprises a second RS flip-flop circuit; and the validation circuit comprises one of an OR gate and a NOR gate, the one of OR gate and NOR gate being connected to the outputs of the first and second flip-flop circuits.

4. The device according to claim 3, wherein the characteristic bits are identical to one another and wherein the first logic circuit further comprises an AND gate receiving the characteristic bits and a signal for the reception of the characteristic bits, the AND gate being connected to the input of the first RS flip-flop.

5. The device according to claim 1, wherein the means for counting comprises a counter of prepaid units.

6. A method of limiting the number of authentication operations performed by a chip card, the method comprising the steps of:

performing a first authentication procedure, the first authentication procedure further including the step of transmitting characteristic bits from a chip card reader to the chip card, counting the number of authentication operations executed by the chip card, the counting step including the steps of comparing the number of authentication operations executed by the chip card with a predetermined limit, and modifying the state of a register, encoding the characteristic bits, transmitting the encoded characteristic bits to the chip card reader; and limiting the number of authentication operations executed by the chip card chip, the limiting step including the step of performing a second authentication procedure, the second authentication procedure further including, only if the comparison indicates that the limit has not be reached, the steps of transmitting authentication bits from the chip card reader to the chip card, encoding the authentication bits, ascertaining that characteristic bits have been received at the chip card and that the state of the register has been modified, authorizing the transmission of the encoded authentication bits based on the ascertaining step, and transmitting the encoded authentication bits to the chip card reader based on the authorizing step.

7. The method according to claim 6, wherein the authentication bits are encoded based on a secret encoding algorithm stored in the chip card and a secret code stored in the chip card.

8. The method according to claim 6, wherein the characteristic bits transmitted to the chip card are the same for different authentication operations that are performed.

9. The method according to claim 6, wherein the encoded characteristic bits transmitted to the chip card reader vary for different authentication operations that are performed.

10. The method according to claim 9, wherein the encoded characteristic bits vary based on the state of the register.

11. The method according to claim 6, wherein the register modifying step comprises the step of decrementing a counter of prepaid units.

12. The method according to claim 6, wherein the characteristic bits that are transmitted to the chip card during an authentication operation are all one of 1's and 0's.

13. A chip for a chip card comprising:

an input-output circuit, the input-output circuit defining means for receiving characteristic bits and authentication bits transmitted from a chip card reader;

a register, the state of the register being indicative of a number of authentication operations that have been performed, the state of the register being modified in response to the reception of the characteristic bits and contingent upon the register not having reached a limit of authentication operations; and a programmable circuit, the programmable circuit defining means for encoding the characteristic bits and the authentication bits, and means for authorizing the chip card to transmit the encoded authentication bits, the authorization being in response to the reception of the characteristic bits and the modification of the register.

14. The chip according to claim 13, wherein the programmable circuit comprises a first RS flip-flop circuit, the first RS flip-flop circuit defining means for registering the reception of the characteristic bits.

15. The chip according to claim 14, wherein the programmable circuit comprises a second RS flip-flop circuit, the second RS flip-flop circuit defining means for registering the modification of the register.

16. The chip according to claim 15, wherein the means for authorizing is coupled to the first and second RS flip-flops, wherein the outputs of the first and second RS flip-flops are inputs of the means for authorizing, and wherein the means for authorizing comprises one of an OR gate and a NOR gate.

17. The chip according to claim 13, wherein the counter comprises non-volatile memory cells.

18. The chip according to claim 13, wherein the counter is a counter of prepaid units.

* * * * *